US 6,677,104 B2

(12) United States Patent
Mizushima et al.

(10) Patent No.: US 6,677,104 B2
(45) Date of Patent: Jan. 13, 2004

(54) OPTICAL INFORMATION MEDIUM

(75) Inventors: Tetsuro Mizushima, Tokyo (JP); Hiroyasu Inoue, Tokyo (JP); Hiroshi Shingai, Tokyo (JP); Hajime Utsunomiya, Tokyo (JP)

(73) Assignee: TDK Corporation, Tokyo (JP)

( * ) Notice: Subject to any disclaimer, the term of this patent is extended or adjusted under 35 U.S.C. 154(b) by 76 days.

(21) Appl. No.: 09/779,513

(22) Filed: Feb. 9, 2001

(65) Prior Publication Data

US 2001/0036596 A1 Nov. 1, 2001

(30) Foreign Application Priority Data

Feb. 10, 2000 (JP) ........................................ 2000-033150
Jan. 12, 2001 (JP) ........................................ 2001-005376

(51) Int. Cl.⁷ .............................................. G11B 7/24
(52) U.S. Cl. ............... 430/270.13; 430/945; 430/273.1; 430/270.15; 369/275.2; 369/275.5; 428/64.4
(58) Field of Search ................... 430/945, 270.15, 430/273.1, 270.13; 369/275.5, 275.2; 428/64.4

(56) References Cited

U.S. PATENT DOCUMENTS

| | | | | |
|---|---|---|---|---|
| 4,300,143 A | * | 11/1981 | Bell et al. | 430/270.15 |
| 4,891,305 A | * | 1/1990 | Oba et al. | 430/945 |
| 5,255,260 A | * | 10/1993 | Yamada et al. | 369/199 |
| 5,738,947 A | * | 4/1998 | Hijikata et al. | 428/629 |
| 5,972,459 A | * | 10/1999 | Kawakubo et al. | 430/270.13 |
| 6,007,889 A | * | 12/1999 | Nee | 428/64.4 |
| 6,177,166 B1 | * | 1/2001 | Ohno et al. | 430/270.13 |
| 6,242,068 B1 | * | 6/2001 | Preuss | 428/64.4 |
| 6,291,047 B1 | * | 9/2001 | Kobayashi et al. | 428/64.4 |
| 6,292,457 B1 | * | 9/2001 | Preuss et al. | 428/64.4 |
| 6,416,837 B1 | * | 7/2002 | Kojima et al. | 430/270.13 |
| 6,451,402 B1 | * | 9/2002 | Nee | 428/64.1 |

FOREIGN PATENT DOCUMENTS

| | | | |
|---|---|---|---|
| EP | 0064777 | * | 11/1982 |
| JP | 9-63118 | | 3/1997 |
| JP | 10-011799 | * | 1/1998 |
| JP | 10-320859 | | 12/1998 |
| JP | 11-120613 | | 4/1999 |

OTHER PUBLICATIONS

Machine translation of JP 09–063118.*
Machine translation of 10–011799 (attached to reference).*

* cited by examiner

*Primary Examiner*—Martin Angebranndt
(74) *Attorney, Agent, or Firm*—Oblon, Spivak, McClelland, Maier & Neustadt, P.C.

(57) ABSTRACT

Noise of the read-out signal is reduced in an optical information medium comprising a supporting substrate and a reflective layer disposed on the supporting substrate wherein the reading beam irradiates the medium from the side where the reflective layer is formed. In addition, noise of the read-out signal is reduced without adversely affecting the recording properties in an optical information medium comprising a supporting substrate, and a reflective layer and a recording layer disposed on the supporting substrate in this order wherein the recording beam irradiates the medium from the side where the reflective layer is formed. In the medium, the reflective layer has a crystallite size of up to 30 nm.

22 Claims, 1 Drawing Sheet

OPTICAL INFORMATION MEDIUM

BACKGROUND OF THE INVENTION

1. Field of the Invention

This invention relates to an optical recording medium such as a read only optical recording disk and an optical recording disk.

2. Prior Art

Optical information media such as read-only optical disks and optical recording disks have been required to have a higher capacity by increasing the recording density for the purpose of recording and storing an enormous amount of information as in the case of motion picture information. Extensive efforts have been dedicated to the research and development of the recording at a higher density to meet such request.

Under such situation, one proposal has been use of a smaller laser beam spot with a reduced diameter in the recording and reading as in the case of DVD (Digital Versatile Disk) by reducing the wavelength used in the recording/reading and increasing the numerical aperture (NA) of the objective lens of the recording/reading optical system. When the DVD is compared to CD, the DVD has realized a recording capacity (of 4.7 GB/side) which is 6 to 8 times larger than that of the CD by reducing the recording/reading wavelength from 780 nm to 650 nm and by increasing the NA from 0.45 to 0.6.

Use of a higher NA, however, invites decrease of tilt margin. Tilt margin is tolerance for the tilting of the optical information medium in relation to the optical system, and the tilt margin is determined by the NA. When the recording/reading wavelength is $\lambda$, and the transparent substrate through which the medium is irradiated with the writing/reading has a thickness t, the tilt margin is proportional to $$\lambda/(t \cdot NA^3)$$

Tilting of the optical recording medium at an angle to the laser beam, namely, occurrence of the tilt results in the generation of wave front aberration (coma aberration). When the substrate has a refractive index of n and a tilt angle of $\theta$, the wave front aberration coefficient is given by $$(\tfrac{1}{2}) \cdot t \cdot \{n^2 \cdot \sin \theta \cdot \cos \theta\} \cdot NA^3/(n^2 - \sin^2 \theta)^{-5/2}$$

These relations indicate that decrease in the thickness t of the substrate is effective when the tilt margin is to be increased with simultaneous suppression the generation of the coma aberration. As a matter of fact, tilt margin is ensured in the case of DVD by reducing the thickness of the substrate to about half (about 0.6 mm) of the thickness of the CD (about 1.2 mm). In the meanwhile, margin of the thickness unevenness of the substrate is given by $$\lambda/NA^4$$

When the substrate has an uneven thickness, such uneven thickness further results in wave front aberration (spherical aberration). When the substrate has a thickness unevenness of $\Delta t$, the spherical aberration coefficient is given by $$\{(n^2-1)/8n^3\} \cdot NA^4 \cdot \Delta t$$

As indicated by these relations, the thickness unevenness of the substrate should be reduced in order to reduce the spherical aberration associated with the increase in the NA. For example, in the case of DVD, $\Delta t$ is suppressed to $\pm 30\,\mu\text{m}$ compared to that of $\pm 100\,\mu\text{m}$ in the CD.

A structure enabling further decrease in the substrate thickness has been proposed in order to realize high quality motion picture recording for a longer period. In this structure, a substrate having normal thickness is used as a supporting substrate for ensuring rigidity of the medium, and the pits and the recording layer are formed on its surface, and a light-transmitting layer in the form of a thin substrate having a thickness of about 0.1 mm is formed on the recording layer. The medium is irradiated with the recording/reading beam through this light-transmitting layer. This structure enables drastic reduction in the thickness of the substrate, and high density recording by the use of a higher NA is thereby enabled. A medium having such structure is described, for example, in Japanese Patent Application Laid-open Nos. (JP-A) 320859/1998 and 120613/1999.

The medium described in JP-A 320859/1998 is a magneto-optical recording medium, and this magneto-optical recording medium has a structure wherein a metal reflective layer, a first dielectric layer, a magneto-optical recording layer, a second dielectric layer, and a light-transmitting layer are disposed on the substrate in this order. In JP-A 320859/1998, surface roughness of the metal reflective layer at the interface between the dielectric layer and the metal reflective layer is reduced to the level of less than 8.0 nm based on the view that increase in the noise of the read-out signal is induced by the excessively large surface roughness of the metal reflective layer formed by sputtering. In JP-A 320859/1998, an aluminum-containing material, and preferably, a material containing aluminum in admixture with at least one member selected from Fe, Cr, Ti and Si, or Au or Ag is used for constituting the metal reflective layer, and ion beam sputtering or magnetron sputtering is employed for the layer formation.

The medium described in JP-A 120613/1999 is a phase change optical recording medium wherein the medium is formed by disposing a reflective layer, a phase change recording layer, and a light-transmitting layer on the substrate in this order. This medium also reduces the surface irregularity of the reflective layer by adopting the reflective layer of particular composition. There is stated in JP-A 120613/1999 that "morphology of the boundary reflecting the grain size determined by the crystallinity of the reflective layer and the composition of the reflective layer", and therefore, it is understood that the surface roughness of the metal reflective layer is reduced in JP-A 120613/1999 by reducing the grain size.

However, in view of optimizing recording sensitivity and reflectivity in the actual medium design, it is not practical that a limitation is set on the material used for the metal reflective layer in order to reduce the surface irregularity.

In addition, it has been found in the investigation of the inventors of the present invention that, in the case of an optical recording medium wherein heat mode recording is employed as in the case of a magneto-optical recording medium or a phase change optical recording medium, an excessive reduction in the grain size of the reflective layer results in various problems in the recording properties of the medium.

SUMMARY OF THE INVENTION

An object of the present invention is to reduce the noise of the read-out signal in an optical information medium comprising a supporting substrate and a reflective layer disposed on the supporting substrate wherein the reading beam irradiates the medium from the side where the reflective layer is formed. Another object of the present invention is to reduce the noise of the read-out signal with no adverse effects on the recording properties in an optical information medium comprising a supporting substrate, and a reflective layer and a recording layer disposed on the supporting substrate in this order wherein the recording beam irradiates the medium from the side where the reflective layer is formed.

Such objects are attained by the present invention as described in (1) to (3), below.

(1) An optical information medium comprising a supporting substrate and a reflective layer disposed on the supporting substrate, wherein said reflective layer has a crystallite size of up to 30 nm, and the medium is used such that the reading beam irradiates the medium from the side where the reflective layer is formed.

(2) The optical information medium according to the above (1) wherein a recording layer is formed on the reflective layer, and the medium is used such that the recording beam irradiates the medium from the side where the reflective layer is formed.

(3) The optical information medium according to the above (2) wherein the reflective layer has an average grain size of at least 20 nm.

DETAILED DESCRIPTION OF THE INVENTION

Figure 1:
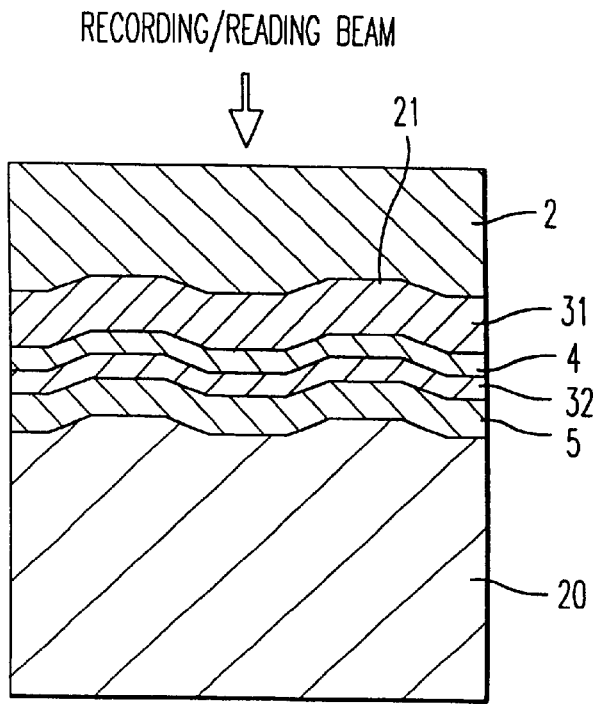
FIG. 1 is a partial cross-sectional view showing an embodiment of the optical information medium of the present invention.

An embodiment of the optical information medium according to the present invention is shown in FIG. 1. The optical information medium shown in FIG. 1 is a phase change optical recording medium, and comprises a supporting substrate 20 and, a reflective layer 5, a second dielectric layer 32, a recording layer 4, a first dielectric layer 31, and a light-transmitting substrate 2 in this order. The recording beam and the read beam irradiates the medium through the light-transmitting substrate 2. It should be noted that an intermediate layer comprising a dielectric material may be disposed between the supporting substrate 20 and the reflective layer 5.

The present invention is applicable regardless of the type of the recording layer, for example, irrespective of whether the medium is a phase change recording medium, a recording medium wherein pits are formed, or a magneto-optical recording medium. The present invention is applicable not only to a recording medium but also to a read only medium wherein prepits have been formed.

Next, various parts of the medium shown in FIG. 1 are described in detail for their constitution.

Supporting Substrate 20

The supporting substrate 20 is provided for the purpose of maintaining the rigidity of the medium. The thickness of the supporting substrate 20 is generally in the range of 0.2 to 1.2 mm, and preferably, in the range of 0.4 to 1.2 mm, and the supporting substrate 20 may be either transparent or non-transparent. Although the supporting substrate 20 may comprise a resin as in the case of typical optical recording medium, the supporting substrate 20 may also be formed from glass. Guide grooves 21 generally provided on the optical recording medium may be provided in the present invention by transcription of the shape of grooves formed on the supporting substrate 20 to the layers formed thereon.

Reflective Layer 5

In the present invention, crystallite size of the reflective layer 5 is up to 30 nm preferably less than 25 nm, and more preferably up to 24 nm. Use of a crystallite size within such range results in good surface properties of the reflective layer on the side of the light entrance, and consequently, in the noise reduction of the read-out signal.

In the present invention, not the grain size of the reflective layer, but the crystallite size of the reflective layer is limited. A crystallite is the domain which has the same crystalline orientation in a grain. In the medium of the present invention, the size of the crystallite is measured by X-ray diffraction. More illustratively, the reflective layer is evaluated with a powder X-ray diffractometer or a thin film X-ray diffractometer, and the crystallite size $D_{hkl}$ is calculated by substituting the measurement data in Scherrer equation:

$$D_{hkl} = K\lambda/\beta\cos\theta \qquad (1)$$

In the equation (1), K is a constant, and in the medium of the present invention, $D_{hkl}$ is calculated by assuming K to be 0.9. $\lambda$ is the wavelength (unit: nm) of the X-ray; $\beta$ is half width (unit: rad) of the diffraction peak; and $\theta$ is Bragg angle of the diffraction line. Use of a diffraction line with strongest intensity is preferable for the calculation of the crystallite size. For example, in the metal reflective layer having face centered cubic structure, the crystallite size is typically determined by using the diffraction line of (111) plane.

A small crystallite size means that the domain that has grown in the same direction in the grain is small. Therefore, if a reflective layer has a grain size equivalent to particular reflective layer but a crystallite size smaller than that reflective layer, the reflective layer will have smaller surface irregularity, and the noise of the read-out signal can be reduced.

There is no particular lower limit in the crystallite size of the reflective layer of the present invention, and it is also acceptable that no clear peak is found in the X-ray diffraction profile, namely, that the reflective layer is not polycrystalline but amorphous.

It should be noted that JP-A 63118/1997 discloses an optical recording medium comprising a substrate, a recording layer, and a metal reflective layer wherein the metal reflective layer has a crystallite size of at least 250 Å and a thickness of 700 to 1500 Å. The medium of the present invention and the medium described in JP-A 63118/1997 share the feature that the crystallite size of the metal reflective layer is limited. The medium of JP-A 63118/1997, however, is a medium of the constitution wherein the metal reflective layer is formed after the formation of the recording layer, and wherein the reading beam irradiates the medium through the recording layer, and such constitution is quite different from that of the medium of the present invention. In addition, the JP-A 63118/1997 defines a lower limit for the crystallite size to thereby improve the durability of the metal reflective layer for temperature and humidity. This is also different from the medium of the present invention.

When the present invention is applied to an optical recording medium wherein heat mode recording is employed as in the case of a magneto-optical recording medium or a phase change optical recording medium, the average grain size of the reflective layer is preferably at least 20 nm, and more preferably at least 30 nm. When the average grain size is excessively small, heat conductivity will be low and heat will not be dissipated from the recording layer upon irradiation of the recording beam, and the recording properties will be impaired. For example, in the case of phase change optical recording medium, record marks may become partly erased by the undissipated heat and the medium will suffer from low CNR (carrier to noise ratio). Therefore, when the medium of the present invention is applied to an optical recording medium wherein heat mode recording is adopted, it is preferable to only reduce the crystallite size and leave the grain size at considerable size. However, an excessively large average grain size will results in poor surface properties of reflective layer, and the average grain size is preferably up to 100 nm, and more preferably up to 70 nm.

In the present invention, the noise reduction is realized by controlling the crystallite size. Accordingly, reduction in the noise of the read-out signal is still realized even when a relatively large grain size is employed in the optical recording medium in order to secure satisfactory recording properties.

It should be noted that the average grain size is measured in the present invention by using an image of the reflective layer taken by a transmission electron microscope (TEM) and assuming the grains as spheres. To be more specific, average grain size d is represented by the equation:

$$d = 4N_L/(\pi N_S)$$

when number of intersections between the grains and a test line of unit length is $N_L$ (unit: /nm) and number of grain in unit area is $N_S$ (unit: /nm$^2$). In determining the $N_L$, a test line of at least 0.2 μm is preferably superposed on the TEM image, and the number of grains intersecting with the test line is measured to thereby calculate the number of intersections per unit length. Sufficient measurement precision is not attained when the test line used is too short. However, use of a line longer than 0.5 μm is not required. In determining the $N_S$, a test rectangle having sides of at least 0.2 μm long is preferably superposed on the TEM image, and the number of grains in the rectangle is counted to calculate the number of grains per unit area. Sufficient measurement precision is not attained when the sides of the test rectangle used is too short. However use of a rectangle having sides longer than 0.5 μm is not required.

The crystallite occupies a part or all of the grain, and therefore, the crystallite size is supposed to be smaller than or equal to the grain size. The crystallite size and the average grain size determined by the procedure as described above, however, often fall into the situation that the crystallite size is larger than the average grain size.

The crystallite size and the grain size may be adjusted by controlling the conditions of the reflective layer formation. The reflective layer is preferably formed by sputtering, and the crystallite size and the grain size can be reduced by increasing the sputtering power and by reducing the sputtering pressure. In such sputtering, the sputtering conditions may also be adequately adjusted to comparatively increase the variation of the grain size while comparatively reducing the variation of the crystallite size.

In the present invention, the reflective layer may be formed from any desired material, and typically, from a metal or a semimetal such as Al, Au, Ag, Pt, Cu, Ni, Cr, Ti, or Si as a simple substance or as an alloy containing at least one of such metals.

By controlling the composition of the reflective layer, the variation of the crystallite size can be increased in relation to the variation of the grain size. To be more specific, crystalline defect can be generated while suppressing the decrease of the grain size and segregation of the auxiliary metal components if a metal of high reflectivity such as Ag or Al is used for the main component in admixture with a minute amount of at least one, and preferably at least two auxiliary metal components. As a consequence, crystallite of the size relatively smaller than the size of the grain will be realized. The amount of each auxiliary metal component added in the reflective layer is preferably 0.05 to 2.0 mole %, and more preferably 0.2 to 0.5 mole %, and the amount of the total auxiliary metal component is preferably 0.2 to 5 mole %, and more preferably 0.5 to 3 mole %. When the amount added is below such range, merit of the addition is not sufficiently realized while addition of an excessive amount result in the decrease of the grain size. The main metal component is preferably Ag in view of the high heat conductivity, while the auxiliary metal component is preferably an element which is easily alloyed with the main metal component or an element which has high solubility limit for the main metal component. Exemplary preferable combinations is use of Ag for the main metal component and at least one, and preferably at least two members selected from Au, Cu, Pt, Pd, and Sb for the auxiliary metal component.

When the reflective layer of amorphous state is to be formed, it is preferable that the reflective layer contains at least two elements, and that the reflective layer can contain a eutectic mixture. In the present invention, "reflective layer can contain a eutectic mixture" means that a eutectic mixture can be present when the reflective layer is crystallized from the molten state. Exemplary preferable alloys which can include a eutectic mixture include alloys prepared by adding at least one element selected From Au, Ce, Ge, In, La, Ni, Pd, Pt, Si, Te, and Cu to Al; alloys prepared by adding at least one element selected from Ce, Cu, Ge, La, S, Sb, Si, Te, and Zr to Ag; alloys prepared by adding at least one element selected from Co, Ge, In, La, Mn, Sb, Si, and Te to Au; and alloys prepared by adding at least one element selected from Fe, Ge, Sb, Si, Te, and Ti to Cu. More illustratively, the composition of the eutectic mixture in the case of Al—Pd alloy is $Al_{92.5}Pd_{7.5}$ in atomic ratio. In the present invention, the reflective layer may comprise a composition which is identical with the eutectic mixture. However, a reflective layer in amorphous state can be obtained even if the reflective layer comprises a composition different from the eutectic mixture as long as the composition can contain the eutectic mixture as in the case of $Al_{79.3}Pd_{20.7}$ alloy which is used in the Example as described below. Accordingly, composition which is capable forming amorphous reflective layer can be determined by experiments.

The reflective layer S is typically deposited to a thickness of 10 to 300 nm. The reflectivity is less likely to be sufficient when the thickness is below such range, and deposition to a thickness beyond such range is economically disadvantageous since no substantial improvement in the reflectivity is attained by additional increase in the thickness. It should be noted that the noise of the read-out signal critically increases when the thickness of the reflective layer reaches 20 nm, and in particular, 30 nm, and the present invention is particularly effective for the medium having the reflective layer of such thickness, In addition, thin reflective layer suffers from increased fluctuation in the reflectivity due to the thickness unevenness, and hence, in an increased variation in the properties in a large scale production. Accordingly, the medium produced in the present invention enjoys reduced variation in the properties as well as reduced noise of the read-out signal.

The reflective layer is preferably formed by vapor deposition such as sputtering and evaporation.

First Dielectric Layer 31 and Second Dielectric Layer 32

These dielectric layers prevent oxidation and degradation of the recording layer 4, and also, protect the supporting substrate 20 and the light-transmitting substrate 2 from the heat transmitted from the recording layer 4 during the recording by blocking the heat or by dissipating such heat in lateral direction of the layer. Provision of the dielectric layers also contributes for improving the degree of modulation. Each dielectric layer may also comprise a laminate of two or more dielectric layers each having different compositions.

The dielectric material used for these dielectric layers is preferably a compound containing at least one metal component selected from Si, Ge, Zn, Al, Zr, Ta, B, alkaline earth metals, and rare earth metals, and the material is preferably an oxide, a nitride, a fluoride, or a sulfide. A mixture containing two or more of the foregoing may also be used. Exemplary preferable materials are a mixture of zinc sulfide and silicon oxide ($ZnS-SiO_2$), aluminum nitride, and aluminum oxide. The thickness of the dielectric layers may be adequately determined so that sufficient improvement in the protection and degree of modulation are achieved. However, the first dielectric layer 31 is preferably deposited to a thickness of 30 to 300 nm, and more preferably, to a thickness of 50 to 250 nm, and the second dielectric layer 32 is preferably deposited to a thickness of 10 to 50 nm, and more preferably, to a thickness of 13 to 45 nm. The dielectric layers are preferably formed by sputtering.

Recording Layer 4

The recording layer is not particularly limited for its composition, and the material used may be adequately selected from various phase change recording materials, and preferably, from those containing at least Sb and Te. However, crystallization temperature of the recording layer containing Sb and Te as the only components is as low as about 130° C., and the storage reliability is insufficient. For the increase in the crystallization temperature, the recording layer may preferably comprise elements other than Sb and Te. Such element is preferably at least one element selected from In, Ag, Au, Bi, Se, Al, P, Ge, H, Si, C, V, W, Ta, Zn, Ti, Sn, Pb, Pd, and rare earth elements (Sc, Y, and lanthanoids), and among these, the preferred is at least one element selected from rare earth elements, Ag, In, and Ge in view of the particularly high effect in improving the storage reliability.

Preferably, the composition containing Sb and Te is the one as described below, namely, the composition represented by the formula (I):

$$(Sb_xTe_{1-x})_{1-y}M_y \qquad (I)$$

wherein M represents the element other than Sb and Te, and atomic ratio of the elements constituting the recording layer is preferably such that:

0.2 ≤ x ≤ 0.90, and
0 ≤ y ≤ 0.25, and more preferably,
0.55 ≤ x ≤ 0.85, and
0.01 ≤ y ≤ 0.20.

When x representing the content of Sb is too small in the above formula, crystallization speed will be excessively low. In addition, when x is too small, reflectivity of the recording layer in the crystalline region will be insufficient, and the output of the read-out signal will be low. When x is extremely low, recording will be difficult. On the other hand, when x is too big, difference in reflectivity between the crystalline phase and amorphous phase will be insufficient.

The element M is not particularly limited. However, it is preferable to select at least one member from the above-indicated elements for the M in view of storage reliability. y representing the content of the element M is preferably within the above-specified range since an excessively large y results in the reduced crystallization speed.

The recording layer is preferably deposited to a thickness of greater than 4 nm to 50 nm, and more preferably, to a thickness of 5 nm to 30 nm. When the recording layer is too thin, growth of the crystalline phase will be difficult, and hence, crystallization will be difficult. On the other hand, an excessively thick recording layer will invite difficulty of recording due to increase in heat capacity of the recording layer as well as reduction in the output of the read-out signal.

The recording layer is preferably formed by sputtering.

Light-Transmitting Substrate 2

The light-transmitting substrate 2 has a light transmittance sufficient for transmitting the recording/reading beam. The advantageous effects of the present invention are not affected by the material or the thickness of the light-transmitting substrate 2. The light-transmitting substrate 2, for example, may comprise a resin plate or a glass plate of the thickness substantially equivalent to that of the supporting substrate 20.

The present invention, however, is particularly effective for use in the high density recording. Accordingly, use of a light-transmitting layer by reducing the thickness of the light-transmitting substrate 2 is preferable as in the case of the light-transmitting layer described in JP-A 320859/1998 as described above for the purpose of enabling the recording at a high recording density by using a recording/reading optical system having a high NA.

The light-transmitting layer may be provided, for example, by adhering a light-transmitting sheet comprising a light-transmitting resin on the first dielectric layer 31 by means of an adhesive or a pressure-sensitive adhesive, or by directly forming the light-transmitting resin layer on the first dielectric layer 31 by coating. The light-transmitting layer is not limited for its material as long as it is capable of sufficiently protecting the reflective layer, the recording layer, and the like, and the light-transmitting layer may comprise a thin film of an inorganic material The inorganic material used for the light-transmitting layer may be selected from various inorganic compounds mentioned in the foregoing in the description of the dielectric layer as well as carbides, carbon, and mixtures thereof such as silicon carbide and diamond-like carbon. The light-transmitting layer comprising an inorganic material may be formed, for example, by vapor deposition such as sputtering.

The thickness of the light-transmitting layer comprising a resin is preferably selected from the range of 30 to 300 μm. When the light-transmitting layer is too thin, unduly serious optical effects may be brought by the dust attached to the surface of the light-transmitting layer. On the other hand, when the light-transmitting layer is too thick, recording at a higher recording density by the use of a higher NA will be difficult. The thickness of the light-transmitting layer comprising an inorganic material is preferably selected from the range of 5 to 500 nm. When the light-transmitting layer is too thin, protective action will be insufficient while an excessively thick light-transmitting layer will invite increase of internal stress and increased occurrence of cracks. It should be noted that the light-transmitting layer comprising a resin may have a thickness of less than 30 μm if there is not need to take the influence of the dust into account, and sufficient protective effects are achieved when the light-transmitting layer has a thickness of 0.5 to 15 μm. When the light-transmitting layer has a thickness of less than 30 μm, the medium is preferably produced in the form of a sealedtype fixed disk as in the case of the hard disk or in the form of a disk accommodated in a cartridge.

Examples of the present invention are given below by way of illustration and not by way of limitation.

EXAMPLES

Example 1

(Optical Recording Disk)

Samples of the optical recording disk having the structure as shown in FIG. 1 were produced by the procedure as described below.

A supporting substrate 20 in the form of a disk having a diameter of 120 mm and a thickness of 1.2 mm was prepared by injection molding polycarbonate. Grooves were simultaneously formed in the injection molding of the supporting substrate 20.

The reflective layer 5 was formed on the supporting substrate 20 by sputtering in argon atmosphere. The composition of the reflective layer and the sputtering pressure and power employed in the formation of the reflective layer are shown in Table 1 It should be noted that Sample Nos.-101 and 102 were formed by using an alloy target, Sample No. 107 was formed by using a silver target having a chip of another target bonded thereto, and Sample No. 109 was formed by using an aluminum target and a palladium target. The reflective layer was formed to a thickness of 100 nm.

The second dielectric layer 32 was formed by sputtering in argon atmosphere using ZnS (50 mole %)-SiO$_2$ (50 mole %) for the target. The second dielectric layer was formed to a thickness of 28 nm.

The recording layer 4 was prepared by sputtering in argon atmosphere using Ag—In—Sb—Te alloy for the target. The recording layer had the composition (molar ratio):

$(Sb_{0.72}Te_{0.28})_{0.9}(Ag_{0.6}In_{0.4})_{0.1}$

The recording layer was formed to a thickness of 15 nm.

The first dielectric layer 31 was formed by sputtering in argon atmosphere using ZnS (80 mole %)-SiO$_2$ (20 mole %) for the target. The first dielectric layer was formed to a thickness of 230 nm.

The light-transmitting substrate 2 was formed on the surface of the first dielectric layer 31 by adhering a polycarbonate plate of 0.6 mm thick to the first dielectric layer 31.

The recording layer of the samples was initialized (crystallized) on a bulk eraser, and the samples were recorded on an optical recording medium evaluator under the conditions:

laser beam wavelength: 634 nm,
numerical aperture, NA: 0.6,
linear velocity: 3.5 m/s, and
read power: 0.9 mW to evaluate the noise level at a frequency of 4.3 MHz a frequency corresponding to 3T signal in 8–16 modulation). In addition, 3T single signal in 8–16 modulation was recorded under the conditions as described above to measure the CNR. It should be noted that the reflectivity of a medium differs by the composition of the reflective layer, and in the measurement of the noise level, calibration was conducted on the bases of the reflectivity. The results are shown in Table 1.

Samples formed only with the reflective layer 5 were also produced in order to measure the crystallite size and the grain size. The crystallite size of these samples were calculated by the procedure as described above by using a thin film X-ray diffractometer. These samples were also measured for the grain size by a transmission electron microscope, and the average grain size was calculated by the procedure as described above. It should be noted that the test line superposed in the determination of the grain size was 0.4 μm long, and the test rectangle depicted was a square having a side of 0.4 μm. The results are shown in Table 1.

TABLE 1

| Sample No. | Composition of reflective layer (mole %) | Sputtering pressure (Pa) | Sputtering Power (W) | Crystallite size (nm) | Average grain size (nm) | Noise level (dBm) | 3T-CNR (dB) |
|---|---|---|---|---|---|---|---|
| 101 | Ag$_{98}$Pd$_1$Cu$_1$ | 0.2 | 1000 | 22 | 30 | −70.2 | 50.5 |
| 102 | Ag$_{98}$Pd$_1$Cu$_1$ | 1.0 | 1000 | 25 | 40 | −69.7 | 50.6 |
| 103 | Au | 0.2 | 750 | 23 | 70 | −70.7 | 49.7 |
| 104 | Au | 0.2 | 100 | 28 | 70 | −69.9 | 49.5 |
| 105 | Pd | 0.4 | 400 | 23 | 40 | −70.7 | 49.3 |
| 106 | Ag | 0.2 | 500 | 26 | 70 | −69.0 | 51.0 |
| 107 | Ag$_{98.5}$Au$_{0.3}$Cu$_{0.3}$Pt$_{0.3}$Pd$_{0.3}$Sb$_{0.3}$ | 0.2 | 500 | 17 | 40 | −70.4 | 50.8 |
| 108 | Al | 0.4 | 1000 | 45* | 90 | −61.9 | 49.5 |
| 109 | Al$_{79.3}$Pd$_{20.7}$ | 0.2 | 1000 | Below detection limit | <20* | −69.9 | 39.6 |

*a value outside the scope of the invention

The results shown in Table 1 reveal the merits of the present invention. In the samples wherein the crystallite size is 30 nm or less, the noise level of the read-out signal is reduced. Comparison between Sample Nos. 101 and 102 and comparison between Sample Nos. 103 and 104 reveal that the crystallite size can be reduced to thereby reduce the noise level by reducing the sputtering pressure or increasing the sputter power even when the composition of the reflective layer is identical. Sample Nos. 103 and 104 wherein the average grain size is equivalent and the crystallite size is different also reveal that the crystallite size and the average grain size can be controlled independently from each other, and that the noise level is dependent not on the average grain size but on the crystallite size.

In Sample No. 109 wherein the reflective layer had an average grain size of less than 20 nm (amorphous state), satisfactory recording could not be conducted and the CNR was low. In contrast, in the samples having the reflective layer with the average grain size of 20 nm or more, the CNR was sufficiently high and the recording could be satisfactorily accomplished.

In Sample No. 107 wherein the reflective layer contains Ag as its main component and a minute amount of other elements as auxiliary components, the crystallite size is smaller than that of the Sample No. 106 wherein the reflective layer solely comprises the Ag. In addition, the CNR of Sample No. 107 is little inferior to Sample No. 106 since Sample No. 107 has an average grain size of 40 nm and the heat conductivity is not so much reduced.

Example 2

(Optical Recording Disk)

Samples of the optical recording disk having the structure as shown in FIG. 1 were produced by the procedure as described below.

A supporting substrate 20 in the form of a disk having a diameter of 120 mm and a thickness of 1.1 mm was prepared by injection molding polycarbonate. Grooves were simultaneously formed in the injection molding of the supporting substrate 20.

The reflective layer 5 was formed on the supporting substrate 20 by sputtering in argon atmosphere. The composition of the reflective layer, and the sputtering pressure and power adopted in the formation of the reflective layer are shown in Table 2. The reflective layer was formed to a thickness of 100 nm. It should be noted that the reflective layers of Sample Nos. 201 to 209 in Table 2 were formed under the same conditions as the reflective layers of Sample Nos. 101 to 109 in Table 1.

The second dielectric layer 32 was formed by sputtering in argon atmosphere using $Al_2O_3$ for the target. The second dielectric layer was formed to a thickness of 25 nm.

The recording layer 4 was prepared by sputtering in argon atmosphere. The recording layer had the composition (molar ratio):

$$(Sb_{0.8}Te_{0.2}))_{0.93}(Ag_{0.07}In_{0.07}Ge_{0.86})_{0.07}$$

The recording layer was formed to a thickness of 12 nm.

The first dielectric layer 31 was formed by sputtering in argon atmosphere using ZnS (80 mole %)-$SiO_2$ (20 mole %) for the target. The first dielectric layer was formed to a thickness of 140 nm.

The light-transmitting substrate 2 (the light-transmitting layer) was formed on the surface of the first dielectric layer 31 by applying a UV curable resin. The light-transmitting substrate 2 was formed to a thickness of 100 μm.

The recording layer of the samples was initialized (crystallized) on a bulk eraser, and the samples were recorded on an optical recording medium evaluator under the conditions:

laser beam wavelength: 405 nm, numerical aperture, NA: 0.85, linear velocity: 6.5 m/s, and read power: 0.3 mW to evaluate the noise level at a frequency of 4.7 MHz (a frequency corresponding to 8T signal in (1,7)RLL modulation). In addition, 8T single signal in (1,7)RLL modulation was recorded under the conditions as described above to measure the CNR. It should be noted that the reflectivity of a medium differs by the composition of the reflective layer, and in the measurement of the noise level, calibration was conducted on the bases of the reflectivity The results are shown in Table 2.

The samples were also evaluated for the crystallite size and the grain size by repeating the procedure of Example 1. The results are shown in Table 2.

TABLE 2

| Sample No. | Composition of reflective layer (mole %) | Sputtering pressure (Pa) | Sputtering power (W) | Crystallite size (nm) | Average grain size (nm) | Noise level (dBm) | 8T-CNR (dB) |
|---|---|---|---|---|---|---|---|
| 201 | $Ag_{98}Pd_1Cu_1$ | 0.2 | 1000 | 22 | 30 | −68.8 | 55.8 |
| 202 | $Ag_{98}Pd_1Cu_1$ | 1.0 | 1000 | 25 | 40 | −68.4 | 55.5 |
| 203 | Au | 0.2 | 750 | 23 | 70 | −69.9 | 53.3 |
| 204 | Au | 0.2 | 100 | 28 | 70 | −69.1 | 53.1 |
| 205 | Pd | 0.4 | 400 | 23 | 40 | −70.0 | 53.2 |
| 206 | Ag | 0.2 | 500 | 26 | 70 | −68.0 | 55.3 |
| 207 | $Ag_{98.5}Au_{0.3}Cu_{0.3}Pt_{0.3}Pd_{0.3}Sb_{0.3}$ | 0.2 | 500 | 17 | 40 | −69.0 | 56.0 |
| 208 | Al | 0.4 | 1000 | 45* | 90 | −59.5 | 50.5 |
| 209 | $Al_{79.3}Pd_{20.7}$ | 0.2 | 1000 | Below detection limit | <20* | −69.0 | 41.2 |

*a value outside the scope of the invention

The results shown in Table 2 demonstrate the merits of the present invention, and the samples having the crystallite size of up to 30 nm exhibited reduced noise level of the read-out signal.

Satisfactory recording could not be conducted in Sample No. 209 wherein the reflective layer had an average grain size of less than 20 nm, and the CNR was low. In contrast, in the samples wherein the reflective layer had an average grain size of 20 nm, or more, satisfactory recording could be conducted, and the CNR was sufficiently high.

Example 3

(Read Only Optical Recording Disk)

Samples of the read only optical recording disk were produced by the procedure as described below.

A polycarbonate supporting substrate in the form of a disk having a diameter of 120 mm and a thickness of 1.2 mm formed with pits (minimum pit length, 0.224 pin) retaining random signals in 8–16 modulation was prepared, and a reflective layer was formed on the supporting substrate to a thickness of 100 nm. The composition of the reflective layer, and the sputtering pressure and power adopted in the formation of the reflective layer are shown in Table 3. A light-transmitting layer was then formed by applying a UV curable resin by spin coating and curing. The light-transmitting layer was formed to a thickness of 100 μm to obtain the optical disk sample.

The samples were evaluated on an optical recording medium evaluator for the jitter of the read-out signal by reading the signals under the conditions;

laser wavelength: 405 nm, numerical aperture, NA: 0.85, and linear velocity: 5.5 m/s.

The results are shown in Table 3. The jitter measured was clock jitter evaluated by measuring the read-out signal with a time interval analyzer, and calculating $$\sigma/Tw\ (\%)$$

wherein Tw is the window width. The Tw is 13.3 ns under the conditions as described above. When the thus measured jitter is up to 13%, the error will be within acceptable range, and the jitter should be up to 10% to provide sufficient margins.

The samples were also evaluated for the crystallite size and the grain size by repeating the procedure of Example 1. The results are shown in Table 3.

TABLE 3

| Sample No. | Composition of Reflective layer (mole %) | Sputtering pressure (Pa) | Sputtering power (W) | Crystallite size (nm) | Average grain size (nm) | Jitter (%) |
|---|---|---|---|---|---|---|
| 301 | Al | 0.4 | 1000 | 45* | 90 | 14.8 |
| 302 | $Ag_{98}Pd_1Cu_1$ | 0.2 | 1000 | 22 | 30 | 11.7 |
| 303 | $Al_{79.3}Pd_{20.7}$ | 0.2 | 1000 | Below detection limit | <20 | 8.4 |

*a value outside the scope of the invention

The results of Table 3 reveal the merits of the present invention. The jitter of the read-out signal in a high density recording disk wherein the minimum pit length is low can be markedly reduced by reducing the crystallite size of the reflective layer, and in particular, by using the reflective layer in amorphous state.

Samples of the optical recording disk were produced by reducing the thickness of the reflective layer to 50 nm in Sample Nos. 301 and 303 in Table 3, and the samples were evaluated for the jitter. The jitter was 10.6% in the sample wherein the thickness of the reflective layer has been reduced to 50 nm in Sample No. 301, and 8.1% in the sample wherein the thickness of the reflective layer has been reduced to 50 nm in Sample No. 303. These results reveal that the control of the crystallite size of the reflective layer is effective in reducing the jitter even when the reflective layer has a thickness of 50 nm.

Figure 2:
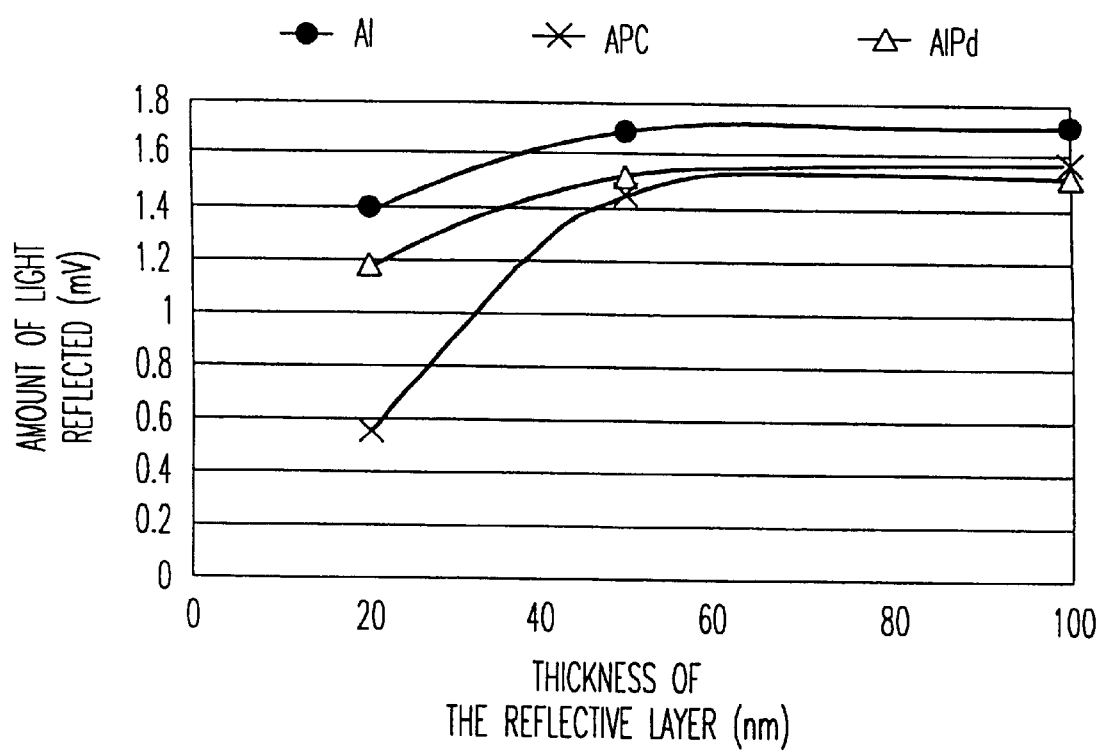
FIG. 2 is a graph showing amount of the light reflected in relation to the thickness of the reflective layer.

The samples of Table 3 and the samples produced by varying the thickness of the reflective layer in the samples of Table 3 were evaluated for the amount of the light reflected. FIG. 2 shows the amount of the light reflected in relation to the thickness of the reflective layer. In FIG. 2, $Ag_{98}Pd_1Cu_1$ is represented by APC, and $Al_{79.3}Pd_{20.7}$ is represented by AlPd. The results shown in FIG. 2 reveal that fluctuation in the amount of the light reflected in relation to the thickness of the reflective layer can be reduced by increasing the thickness of the reflective layer.

MERITS OF THE INVENTION

In the present invention, reduction of noise of the read-out signal is realized in an optical information medium comprising a supporting substrate, and a reflective layer disposed on the supporting substrate by controlling the crystallite size of the reflective layer. In addition, noise is reduced without adversely affecting the recording properties in an optical information medium comprising a supporting substrate, and a reflective layer and a recording layer disposed on the supporting substrate in this order by controlling the crystallite size independently from the average grain size.

Japanese Patent Application Nos. 033150/2000 and 005376/2001 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. An optical information medium, comprising:
    a supporting substrate;
    a reflective layer formed on said supporting substrate; and
    a recording layer formed on said reflective layer;
    wherein said reflective layer has a grain size of at least 20 nm and a crystallite size of up to 30 nm;
    wherein said reflective layer does not contain Au; and
    wherein a reading beam irradiates the optical information medium from a side opposite the substrate.

2. The optical information medium according to claim 1, which is a phase change optical recording medium.

3. The optical information medium according to claim 2, wherein said recording layer comprises a material comprising Sb and Te.

4. The optical information medium according to claim 3, wherein said recording layer further comprises at least one element selected from the group consisting of In, Ag, Au, Bi, Se, Al, P, Ge, H, Si, C, V, W, Ta, Zn, Ti, Sn, Pb, Pd, and rare earth elements.

5. The optical information medium according to claim 2, wherein said recording layer comprises a composition represented by formula (I):

$$(Sb_xTe_{1-x})_{1-y}M_y \quad (I)$$

wherein M represents an element other than Sb and Te; and an atomic ratio of the elements constituting the recording layer is such that:
$0.2 \leq x \leq 0.90$, and
$0 \leq y \leq 0.25$.

6. The optical information medium according to claim 2, wherein said recording layer has a thickness of >4 nm to 50 nm.

7. The optical information medium according to claim 1, further comprising:
    a first dielectric layer on top of said recording layer;
    a second dielectric layer between said reflective layer and said recording layer; and
    a light-transmitting substrate on top of said first dielectric layer.

8. The optical information medium according to claim 7, wherein said first dielectric layer and said second dielectric layer comprise a compound containing at least one component selected from the group consisting of Si, Ge, Zn, Al, Zr, Ta, B, alkaline earth metals, and rare earth metals; and
    wherein said compound is an oxide, a nitride, a fluoride, or a sulfide.

9. The optical information medium according to claim 7, wherein said first dielectric layer has a thickness of 30 to 300 nm, and said second dielectric layer has a thickness of 10 to 50 nm.

10. The optical information medium according to claim 7, wherein said light-transmitting substrate comprises a thin film of an inorganic material.

11. The optical information medium according to claim 10, wherein said inorganic material is a carbide, carbon, silicon carbide or diamond-like carbon.

12. The optical information medium according to claim 7, wherein said light-transmitting substrate comprises a resin and has a thickness of 30 to 300 μm.

13. The optical information medium according to claim 7, wherein said light-transmitting substrate comprises an inorganic material and has a thickness 5 to 500 nm.

14. The optical information medium according to claim 1, further comprising:
    an intermediate layer comprising a dielectric material between the supporting substrate and the reflective layer.

15. The optical information medium according to claim 1, wherein said supporting substrate has a thickness of 0.2 to 1.2 mm.

16. The optical information medium according to claim 1, wherein said supporting substrate comprises a resin or glass.

17. The optical information medium according to claim 1, wherein said supporting substrate comprises guide grooves.

18. The optical information medium according to claim 1, wherein said average grain size is up to 100 nm.

19. The optical information medium according to claim 1, wherein said reflective layer comprises at least one element selected from the group consisting of Al, Ag, Pt, Cu, Ni, Cr, Ti and Si.

20. The optical information medium according to claim 1, wherein said reflective layer comprises Ag as a main metal component and 0.2 to 5 mole % of at least one auxilliary metal component selected from the group consisting of Cu, Pt, Pd and Sb.

21. The optical information medium according to claim 1, wherein said reflective layer has a thickness of 10 to 300 nm.

22. The optical information medium according to claim 1, wherein said reflective layer is deposited on said substrate by sputtering using a sputtering pressure of 0.2 to 1.0 Pa and a sputtering power of 100 to 1000 W.

* * * * *